UNITED STATES PATENT OFFICE 2,479,836

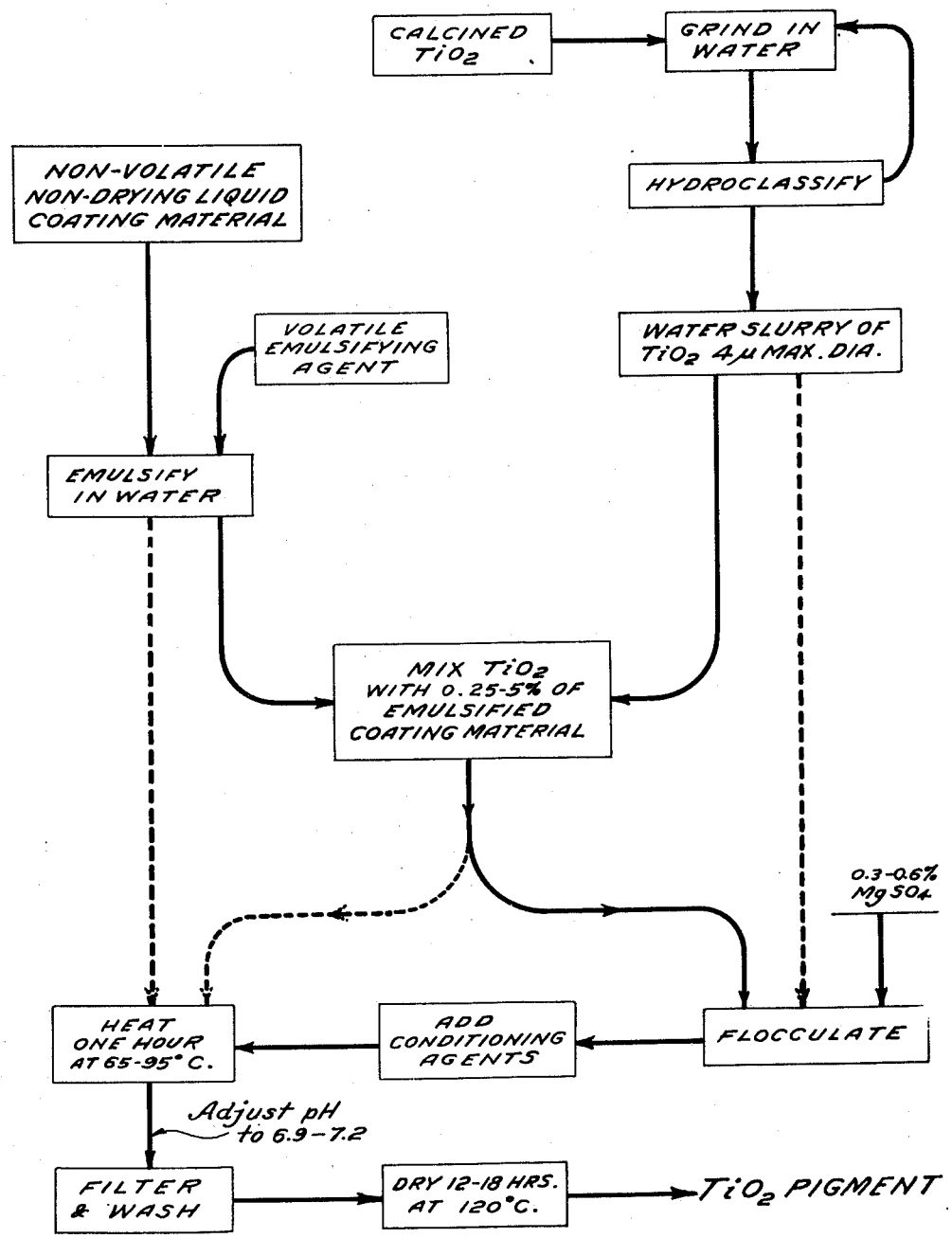

FINISHING OF PIGMENTS

Waller H. Hoback and Winfred J. Cauwenberg, Piney River, and Walter R. Whately, Lynchburg, Va., assignors to American Cyanamid Company, New York, N. Y., a corporation of Maine Application August 7, 1947, Serial No. 767,067

13 Claims. (Cl. 260—22)

This invention relates to the finishing of pigments, and more particularly to the coating of pigments with relatively small quantities of a liquid organic coating material which will improve their texture or freedom from sandiness and grit, their hiding power and, in preferred embodiments of the invention, their color, tinting strength and gloss.

It is a characteristic property of calcined $TiO_2$ pigments and of many other water-insoluble pigments of the type hereinafter described, that they tend to develop aggregation during filtering, drying and other mechanical working steps involving pigment-to-pigment contact. Although mechanical comminution such as dry milling will break the pigment cake into a fine powder, many of the aggregates formed during drying are too strong to be broken apart and frequently new pigment-to-pigment contacts are formed by the grinding action. Since the dried pigment cake is sponge-like in nature, due to the capillaries left by elimination of water in the drying process, these aggregates exhibit a tendency to collapse and cement together under impact instead of breaking apart cleanly as a totally solid material would do. Consequently, the range of particle sizes present in the dried and pulverized pigment is greater than that for the pigment in the water slurry formed during the final stages of its manufacture, but before drying and grinding. Moreover, further cementing of particles may occur as the pigment is aged as a finely ground, packaged material.

It has previously been proposed to overcome the formation of aggregates in pigments by so-called flushing procedures, which consist in dispersing the wet pigment cake in a large quantity of oil. This procedure has been used for the direct manufacture of oil paints, but is of course unsuitable for the commercial large-scale manufacture of dry, powdered pigments for general use.

It has also been proposed to apply to the finely divided pigments, prior to drying and grinding, small quantities of certain materials which are intended to prevent adhesion and cementing of the pigment particles. Representative materials that have been suggested for this purpose are cationic wetting or surface-active agents such as quaternary ammonium compounds containing a long alkyl chain of 8 or more carbon atoms, salts of organic compounds containing a sulfonium or phosphonium residue and the like; salts of fatty acids such as coconut oil fatty acids, oleic acid and the like, ammonium naphthenates, and esters and amides of naphthenic acids. Most of these compounds are water-soluble, and therefore have a very strong adverse effect on the drying power of paint vehicles, in addition to reducing the water resistance of the paint films. Relatively water-insoluble materials, such as oleic and cottonseed oil fatty acids, required special methods of application, and could only be distributed uniformly over the pigments by application as a spray or vapor after the pigment had been dried, at which time the cohesion and cementation of the pigment particles had already occurred.

The present invention has for one of its principal objects the provision of a novel method of applying relatively small quantities of organic liquid coating materials to water-insoluble pigments while the latter are still in a completely dispersed condition, and prior to the drying and grinding steps, so that surface adhesion and cementation of the pigment particles during drying and grinding is avoided. Another principal object is the provision of a process of this type which is especially adapted for use in the commercial manufacture of calcined $TiO_2$ pigments. In addition, a further and even more important object of the invention is the provision of a novel class of coating agents which, when applied to water-insoluble pigments in general and calcined $TiO_2$ pigments in particular, will improve materially the tinting strength, hiding power and gloss of the pigments in addition to improving their texture. The invention also includes, as a further important feature thereof, the provision of a new class of water-insoluble pigments, the surfaces of which are coated uniformly with small quantities of the novel coating materials hereinafter defined.

We have found that a number of operating advantages are obtained in the application of small quantities of liquid organic coating materials to pigments by applying the coating material to an aqueous suspension or slurry of the water-insoluble pigment in the form of a previously prepared, aqueous emulsion of the coating material. By this procedure we are able to obtain a uniform and complete admixture of the liquid coating material with the pigment while both are in an extremely finely divided condition. We find, moreover, that the application of small quantities of the emulsified coating material to the pigment slurry in this manner facilitates the subsequent processing steps, since the coating material assists in flocculating and filtering the pigment slurry and actually reduces the time necessary for drying the dewatered pigment to a water content on the order of 0.2% which is necessary for commercial packaging and sale.

Although this novel method of procedure may be applied with success to any water-insoluble pigment, it is of particular value in the manufacture of calcined TiO$_2$ pigments, which possess a hydrophilic nature. The TiO$_2$ pigments are more thoroughly and more quickly wet by water than they are by the organic binders or vehicles used in paint and printing ink manufacture, and consequently it is difficult to wet completely the surfaces of these pigments by the vehicles. Accordingly, continued grinding of the pigments into the vehicles, as in paint mills, is resorted to, and this grinding frequently causes aggregation of the particles of the TiO$_2$ pigments, with the result that the average pigment particle size in the finished paint or ink is greater than it is in the dry pigment itself. By coating the surfaces of these pigments with a thin film of a water-insoluble liquid, non-volatile, non-drying coating material which is soluble in the vehicles used in paint and printing ink manufacture, the speed and ease of wetting of the pigment by the vehicle is greatly increased and long grinding need not be resorted to.

A procedure for the finishing of a calcined TiO$_2$ pigment that is especially well adapted for commercial manufacturing plant procedure is outlined on the attached drawing, wherein the single figure is a flow diagram illustrating the steps of the process. Referring to this drawing the calcined TiO$_2$, which may be anatase or rutile TiO$_2$ manufactured by standard processes to develop pigment properties in the product, is ordinarily ground in water to a fine particle size and is hydroclassified with return of the coarse or oversize particles to the grinding step. Ordinarily a TiO$_2$ is produced by this method having an average ultimate particle size of about 0.2–0.3 micron diameter, some of which particles may be aggregated to a maximum of 4 microns diameter, in the form of a deflocculated or finely dispersed water slurry. In accordance with the process of the present invention, this water slurry is mixed with an aqueous emulsion of the oil-in-water type in which the dispersed phase is a water-insoluble, non-volatile and non-drying liquid coating material of the type hereinafter described. Preferably this coating material is emulsified with the aid of a volatile emulsifying agent, by which term we mean either an emulsifying agent which can be completely volatilized from the wet pigment under the temperature conditions of the subsequent drying step or one in which an essential ingredient is volatilized under these conditions so that the agent loses its ability to stabilize the aqueous emulsion of the coating material. In other words, we preferably employ an aqueous emulsion of the coating material which breaks upon subsequent heating, thereby spreading the coating materials on the particles of the pigment.

The aqueous emulsion of coating material may be mixed with the water slurry of finely divided TiO$_2$ in any one or more of various stages of the finishing procedure. Thus, as indicated by solid flow lines on the diagram, the mixture may be effected prior to flocculating and conditioning the pigment. Alternatively, however, as indicated by the dotted flow lines, the water slurry of TiO$_2$ may be flocculated and treated with conditioning agents prior to being mixed with the emulsified coating material. By conditioning agents we mean, of course, those agents which are ordinarily added in small amounts to TiO$_2$ pigments to impart or improve color stability and to preserve texture after drying; thus, for example, TiO$_2$ pigments are frequently treated at this stage of the manufacturing process with aqueous titanium sulfate solutions, with zinc sulfate solutions or with sodium silicate solutions in quantities corresponding to about 0.33% of TiO$_2$, ZnO or SiO$_2$, based on the dry weight of the TiO$_2$ pigment. Quantities of aluminum sulfate corresponding to 1% of Al$_2$O$_3$ on the dry weight of the pigment are also frequently added. Combinations of two or more of these conditioning agents are frequently used.

After mixing the aqueous emulsion of coating material with the water slurry of finely divided TiO$_2$, either before or after flocculating, we prefer to agitate the mixture at slightly elevated temperatures of about 30° to 60° C. for periods of time on the order of one hour, in order to obtain a uniform mixing of the TiO$_2$ with the emulsified coating material. Microscopic examination of samples taken during this mixing has shown that finely divided TiO$_2$ particles cluster on the globules of coating material which constitute the dispersed phase of the emulsion, and during the heating and agitation most of the TiO$_2$ particles become attached to the emulsified coating material in this manner. It should be understood, however, that good results are obtainable without the necessity of continued heating and agitation of the emulsion with the pigment slurry, and that this step of the process may be eliminated if desired.

The next stage of the manufacturing process is the dewatering of the pigment slurry containing the emulsified coating material. It is an important advantage of the process of our invention that the presence of small quantities on the order of 0.25–5% or more of the emulsified coating material facilitates the elimination of water from the pigment slurry and thereby reduces losses of pigment in the filtering and washing step. We believe that these advantages are a direct result of the clustering of the TiO$_2$ pigment particles on the globules of emulsified coating material, since this condition appears to hold the pigment particles in the form of coarse flocs from which the water is more quickly eliminated and which are not broken up by washing to remove water-soluble salts from the filter cake.

After filtering and washing, the TiO$_2$ press cake containing the coating material is subjected to drying at elevated temperatures above 100° C. but not higher than 200° C., and preferably at 115–130° C. in a rotary dryer or in a tray dryer. It is during this drying stage, which must be continued long enough to reduce the water content of the TiO$_2$ pigment to about 0.2%, that the cementing together of particles of the TiO$_2$ pigment into aggregate is ordinarily encountered. In the process of our invention, however, this cementing action is almost completely avoided, since most of the TiO$_2$ particles entering the dryer are separately clustered about the surfaces of globules of the coating material. As the water constituting the boundaries of these globules is removed by drying the coating material spreads over the surfaces of the TiO$_2$ particles, thereby preventing a surface-to-surface contact and reducing cementation to a minimum. It will thus be seen that the addition of the coating material in the form of an emulsion to the aqueous TiO$_2$ slurry aids materially in each of the subsequent steps of commercial pigment manufacture; the emulsified coating material holds the pigment particles together during filtering and washing and yet prevents actual surface-to-surface contact of these particles during the drying stage and therefore avoids cementation, and subsequent pulverizing of the product from the dryer is greatly facilitated.

In the foregoing description of a preferred embodiment of the process of our invention we have purposely refrained from specifying the exact types of coating materials that may be used. This was done because the selection of coating material is dependent on the purpose for which the pigment is to be used. Where the only improvements desired are in the ease and speed of manufacture and in avoiding cementation, as in the preparation of pigments for rubber compounding or $TiO_2$ pigments for use in leather manufacture, it will be understood that any coating material may be used that is (1) liquid, (2) water-insoluble at ordinary temperatures and capable of forming a stable aqueous emulsion, (3) non-volatile (i. e., not removed by vaporization during the drying step), (4) non-drying (i. e., not converted by polymerization or other form of reaction to a solid material during drying or grinding or on storage of the finished pigment) and (5) preferably containing a small amount of organic acid corresponding to an acid number of at least 10 and preferably about 10–30 to permit the formation of an unstable salt with a volatile base such as ammonia or lower aliphatic or cycloaliphatic amines, morpholine and the like.

Suitable coating materials having the above properties are, for example, liquid esters of higher fatty acids such as ethyl laurate, ethyl oleate, ethyl esters of mixed coconut oil fatty acids and the like, preferably containing small amounts of unesterified fatty acids corresponding to an acid number of 15–25 to permit ready emulsification; the corresponding liquid esters of non-drying higher fatty acids of 8–16 carbon atoms with polyhydric alcohols such as glycerol, ethylene glycol or polyethylene glycols having similar acid numbers; amorphous petroleum wax of low softening point, preferably containing sufficient oleic or other fatty acid to give it an acid number of at least 10–15; liquid fatty acids themselves such as oleic acid, lauric acid, coconut oil fatty acids and the like and liquid, non-volatile esters of organic polycarboxylic acids such as diethyl or dibutyl phthalate, diethyl, dibutyl or diamyl succinate and the like, preferably with acid numbers of 10–25. Any of these and similar compounds may be emulsified in water with the aid of ammonia, volatile amines and other volatile emulsifying agents to produce oil-in-water type emulsions for use in practicing the process of our invention, these emulsions preferably containing about 1–20% by weight of dispersed material.

We have discovered, however, as one of the most important features of our invention, that many of the properties desired in pigments intended for dispersion in organic paint, varnish and printing ink vehicles can be substantially improved by the application thereto of relatively small quantities of a certain definite class of organic coating compounds. These compounds are comprised in the class of liquid, non-drying alkyd resins. As is well known, the alkyd resins are the reaction products of a polyhydric alcohol such as glycerol, ethylene glycol, polyethylene glycols, pentaerythritol and the like with one or more organic polycarboxylic acids. The liquid alkyd resins used in paint, varnish, lacquer and ink manufacture are modified alkyd resins which are modified by a substantial content of a higher monocarboxylic acid of the aliphatic or cycloaliphatic series such as naphthenic acids or aliphatic monocarboxylic acids containing from 6 to about 26 carbon atoms. Those fatty acids derived from glyceride oils such as coconut oil, castor oil, linseed oil and the like are ordinarily described in the technical literature as oil acids; these are usually straight-chain saturated or unsaturated fatty acids containing from about 8 to about 18 carbon atoms.

The preferred alkyd resins used in preparing the improved coated pigments of our invention are, therefore, non-drying alkyd resins which are the reaction product of an organic polycarboxylic acid, a polyhydric alcohol and a monocarboxylic acid of about 6 to about 26 carbon atoms, preferably about 8 to 18 carbon atoms, selected from the group consisting of aliphatic and cycloaliphatic monocarboxylic acids containing from 6 to 26 carbon atoms. In order to ensure the absence of drying properties in the alkyd resins which we employ, we prefer to use those modified with a saturated or only singly unsaturated monocarboxylic acid of about 6 to 26 carbon atoms, or to employ dihydric alcohols such as ethylene glycol or polyethylene glycols, with or without the addition of glycerol or other alcohols containing 3 or more hydroxy groups, in the preparation of the alkyd resins, or both. Fatty acids of 8 to 18 carbon atoms which are saturated or contain only a single double bond are also known as non-drying oil fatty acids since they are obtained commercially from non-drying oils such as coconut oil, castor oil, palm oil and the like, and are sometimes characterized by this designation in the appended claims.

We have also found that improved gloss and color retention are frequently obtained, particularly in the case of titanium dioxide pigments, when the modifying acid is a saturated or only singly unsaturated aliphatic or cycloaliphatic monocarboxylic acid of relatively low molecular weight, such as those containing from about 6 to about 12 carbon atoms. Alkyd resins, particularly those prepared from phthalic anhydride and ethylene glycol or diethylene glycol, modified by a substantial content of these aliphatic acids of relatively low molecular weight, constitute the preferred class of coating agents for use in practicing the present invention.

We have found that the following important advantages are obtained when pigments are coated with small quantities of liquid, non-drying alkyd resins, particularly those having the compositions and characteristics discussed above:

(1) We obtain all of the manufacturing advantages previously enumerated, including greater ease and speed of dewatering, drying and grinding and reduced cementation therein.

(2) The coated pigments are more easily dispersed in organic vehicles of the type of linseed oil, oleoresinous and alkyd enamels, nitrocellulose lacquers and the like, and produce more uniform dispersions therein with correspondingly better texture.

(3) The coated pigments are more readily wetted by organic vehicles, and less readily wetted by water.

(4) The coated pigments show improved stability against moisture adsorption and packing while stored in bulk.

(5) The gloss effect in the final enamel is improved in many cases, both as to original gloss and gloss retention.

(6) In many cases the color of the film is improved, both as to original color and color retention.

(7) Resistance to loss of drying through drier adsorption is improved.

(8) Improved chalk resistance is obtained.

(9) Because of the finer particle size and more uniform dispersion of the pigment, its tinting strength and hiding power are usually increased.

(10) The coated material can be used for the manufacture of some paint types, without having been pulverized to a fine powder.

The manufacturing procedures whereby alkyd resin-coated pigments possessing the above advantages are produced will be apparent from the following detailed description of a preferred method for the production of $TiO_2$ pigments. A liquid, non-drying alkyd resin, which should have an acid number of at least 10 and preferably of 15–20 or more is mixed with about 2–8% of its weight of a volatile base such as ammonia or an aliphatic or cycloaliphatic amine. Morpholine is greatly preferred as the emulsifying agent, since it is miscible in all proportions with water; forms a constant boiling solution; has a high solvency for resins; maintains a constant alkalinity under conditions of boiling or evaporation; readily forms soaps with fatty acids or with fatty acid-modified alkyd resins which are excellent emulsifying agents; and becomes disassociated from the fatty acids or resins at the temperatures and under the conditions used in drying pigments (i. e., at 100–200° C. and in the presence of moisture) and is evaporated, leaving behind the acidic residues which are not water-soluble or dispersible. The resulting mixture is agitated with water, preferably at elevated temperatures of about 120–150° F., until a uniform emulsion of the oil-in-water type is obtained. This emulsion is preferably made at a resin content of about 1–10%, although of course more concentrated emulsions may be used if desired.

The separately prepared emulsion may be mixed with an aqueous slurry of the pigment at any suitable point in the final stages of its manufacture, as discussed above and illustrated on the attached drawing. The subsequent steps of dewatering the pigment slurry and heating the pigment to dry the same and spread the liquid resin on the particles thereof are then carried out, whereupon the dried pigment may be further disintegrated by such mechanical means as micropulverizing, grinding in ring roll mills, jet mills, rod mills and the like and subsequent packaging. In some cases it has been found that pulverizing is not necessary to produce good dispersion in certain types of paint. The final packaged material is similar in color and appearance to the corresponding untreated pigments, although it is more uniform in particle size and texture.

Although many of the advantages enumerated about are most readily obtained in the manufacture of calcined $TiO_2$ pigments, it will be apparent that the invention in its broader aspects is not limited to pigments of this class. On the contrary, any water-insoluble pigment may be coated with small quantities of a liquid coating agent of the type described above, most advantageously with a liquid, non-drying alkyd resin, to obtain at least some of the advantages of the invention. A list of representative pigments which may be coated by the processes outlined above and with one or more of the coating agents specified is as follows:

Inorganic pigments

Chrome yellows
Chrome oranges
Chrome greens
Molybdate oranges
Chromium oxides
Iron blues
Iron oxides
Hydrated iron oxides
Calcium sulfate extenders
Barium sulfate extenders
Calcium carbonate extenders
Magnesium silicates

Organic pigments

Lithol reds
Para reds
Toluidine reds
Red Lake C
Lithol rubines
Pigment scarlets
Eosines
Chlorinated para reds
Alizarines
Dinitraniline oranges
Orthonitraline oranges
Persian oranges
Hansa yellows
Dichlorbenzidine yellows
Tartrazine yellows
Phthalocyanine blue or green
Phospho-tungstic acid or phospho-molybdic acid blues
Phospho-tungstic acid or phospho-molybdic acid greens
Phospho-tungstic acid or phospho-molybdic acid violets
Phospho-tungstic acid or phospho-molybdic acid yellows
Phospho-tungstic acid or phospho-molybdic acid reds The amount of liquid coating agent to be used in practicing our invention is dependent on the type of pigment to be coated, and particularly on its relative surface area. Titanium dioxide pigments having an average particle size of about 0.2–0.3 micron diameter, require from 0.25% to about 5%, based on the dry weight of the pigment. Considerably larger quantities may be required by some of the other pigments listed above having a smaller average particle size and therefore a larger surface area per gram; iron blues, for example, may require from 3–5% up to 25% to obtain optimum results. Quantities up to 35% may be needed by still finer pigments. It will be understood, therefore, that the invention in its broader aspects is not limited to the exact quantities of liquid coating agents described, but that larger or smaller quantities may be employed by those skilled in the art after determining the particle size, adsorptivity and relative surface area of the particular pigment under consideration.

The invention will be further illustrated in greater detail by the following specific examples. It will be understood, however, that although these examples may describe in detail some of the preferred embodiments of the invention they are given primarily for purposes of illustration, and that modifications and substitutions of equivalent materials and process steps may be resorted to within the scope of the appended claims.

Example 1

A pigment TiO₂ having rutile crystal structure was prepared by the following standard manufacturing procedure. A washed titanium sulfate hydrolysate pulp was mixed with about 5% of its weight of a rutile conversion seed, prepared by acidifying sodium titanate with excess hydrochloric acid and boiling for about one hour, about 0.5% of potassium carbonate was added, and the mixture was calcined at 950–975° C. for about 6–8 hours. The calcined product was ground, wet-milled and hydroclassified to produce a TiO₂ pigment slurry having an average particle size of 0.2 to 0.3 micron and a maximum particle or aggregate size of 4 microns.

Nine liters of this slurry, containing 200 grams of TiO₂ per liter or a total of 1800 grams TiO₂ were treated with about 11 grams of magnesium sulfate, dissolved in water, to flocculate the dispersed TiO₂. The flocculated slurry was placed in a vessel equipped with an agitator and an emulsion of a liquid non-drying alkyd resin was slowly added with continuous agitation. This emulsion was prepared by the following procedure:

The alkyd resin was the reaction product of 0.5 mol of phthalic anhydride, 0.5 mol of azelaic acid, 0.5 mol of castor and 1.3 mols of diethylene glycol, heated together at 400–450° F. until a liquid resin having an acid number of 13 to 19 was obtained. To 18 grams of this resin there was added 4.5 grams of morpholine and the mixture was agitated vigorously while 100 grams of water heated to 130° F. were added. The product was a stable oil-in-water type emulsion.

After adding the resin emulsion the TiO₂ slurry was agitated for one hour. It was then filtered and the filter cake was washed with water until the wash water was free from dissolved salts. Tests on the filtrate showed no evidence of resin, indicating that all the resin was retained by the pigment.

The washed filter cake was then heated in an oven at 240° F. in order to reduce the moisture content to 0.1% and distribute the liquid resin over the surfaces of the pigment particles. The dried cake was then disintegrated in a micropulverizer.

The pigment showed superior texture when compared with a sample from the same batch which had not been treated with the coating material. It was also more easily dispersed in linseed oil.

Example 2

A 5-liter sample of rutile TiO₂ pigment slurry similar to that of Example 1 was taken immediately after hydroclassification. It contained 188 grams of TiO₂ per liter, or a total of 940 grams of TiO₂.

A coating emulsion was prepared by adding 1 gram of morpholine to 20 grams of the non-drying alkyd resin of Example 1, then adding 30 grams of water at 130° F. with strong agitation to form an emulsion, and diluting to 2% resin solids by the addition of 950 grams of water at 130° F. as a thin stream with continued agitation.

To the five liters of TiO₂ slurry 470 grams of the 2% resin emulsion were added as a thin, slow stream with constant agitation. This quantity was equivalent to 1% of the non-drying resin, based on the dry weight of the TiO₂.

The treated pigment slurry was then filtered without the addition of MgSO₄ or other flocculating agent. The loss of TiO₂ in filtering was approximately 30% whereas another sample of the same TiO₂ slurry, without flocculation or resin treatment, could be filtered only with great difficulty and with a TiO₂ loss of about 60 to 70%.

The resin-treated filter cake was dried at 240° F. for 3 hours to a moisture content of 0.1% and was then micropulverized. The pigment so obtained was equal in color and tinting strength to standard pigment obtained from the same TiO₂ slurry by the regular manufacturing procedure. When processed into enamel by mixing into drying oils, varnishes, and the like, the resin-treated pigment mixed much more rapidly and developed considerably less consistency. The texture developed in the enamel was considerably finer than the texture produced by the pigment prepared by the standard manufacturing process. Higher brightness, higher gloss and higher hiding power were obtained with the resin-treated pigment as compared with the standard manufacture pigment from the same slurry.

The foregoing improvements were due to a finer and more efficiently distributed dispersion of the TiO₂ in the drying oil vehicle. Upon mixing the resin-coated pigment with the oil, the resin coating dissolved in and was replaced by the oil, thus facilitating a more rapid wetting of the pigment surfaces by oil.

Example 3

The procedure described in Example 2 was repeated with the added feature that the pigment slurry was flocculated immediately after mixing with the resin emulsion and prior to filtration. A control pigment for comparison purposes was prepared by flocculating another sample of the TiO₂ slurry in the same manner, but without addition of the resin emulsion.

A definite increase in the speed of handling was shown by the resin-treated pigment in the filtration, in washing the filter cake, in drying the filter cake (requiring only 3 hrs. to reach 0.1% moisture as compared with 5 hrs. for similar pigment without the resin treatment) and in micropulverizing (at the rate of 31 gms./sec. as compared with 8 gms./sec. for untreated pigment) the dried filter cake, all being of considerable value in plant operation. In addition, a slightly greater yield was obtained in the case of the resin-coated pigment.

The resin-treated pigment showed equal color and tinting strength, and definitely lower oil absorption than the non-resin-treated control pigment. The term "oil absorption" means the minimum quantity of linseed oil necessary to make a paste of a standard weight of the pigment. The standard plant pigment, after micropulverizing, had an oil absorption factor of 24, whereas the oil absorption factor of the resin-treated pigment on the same scale was 19.

When processed into an enamel the resin-coated pigment produced definitely faster mixing, lower consistency, superior texture, brightness, gloss and hiding power in comparison with the non-resin-coated control pigment and also with samples of standard commercial TiO₂ pigment of the same grade produced from the same rutile TiO₂ in the manufacturing plant. These results demonstrate that a composition containing 99% of TiO₂ and 1% of a liquid, non-volatile, non-drying, water-insoluble organic coating material surpasses the properties of a standard TiO₂ pigment of the same grade and containing 100% of TiO₂. The enamel made with the resin-treated pigment showed no retardation in drying whereas the untreated pigment showed definitely slower drying due to drier adsorption.

EXAMPLE 4

A 5-liter sample of TiO₂ pigment slurry taken immediately after hydro-classification, from the same stock of slurry as used in Examples 2 and 3, and containing 188 grams of TiO₂ per liter or a total of 940 grams of TiO₂, was treated with titanium sulfate solution and zinc sulfate solution in amounts equivalent to 0.33% TiO₂ and 0.33% ZnO calculated on the weight of the TiO₂ pigment. The slurry was subsequently heated at 160° F. for one hour, and after cooling its pH was adjusted from 1.8 to a pH of 7.2 by the addition of Na₂CO₃ and NaOH solutions.

To the neutralized pigment slurry 470 grams of 2% resin emulsion, prepared as in Example 2, were added as a thin stream with continued agitation. The quantity of resin thus added constitutes 1% of the dry weight of the TiO₂ pigment. The resin emulsion was introduced at a temperature of 130° F. and agitation was continued for one hour after the addition had been completed.

The pigment slurry was then flocculated by the addition of MgSO₄ solution equivalent to 0.6% MgSO₄ calculated on the dry weight of the TiO₂ pigment.

After the flocculation step the treated pigment slurry was filtered and washed until free from dissolved salts. The resin-treated pigment filtered with less loss, washed more readily and when dried at a temperature of 240° F. to a moisture content of 0.1% eliminated moisture to this minimum amount faster than a corresponding pigment prepared in the same manner but without the resin treatment, two hours of drying being required by the resin-treated pigment as compared with three hours for the untreated pigment. Micropulverizing of the resin-treated pigment was accomplished at a faster rate (65 grams/sec.) as compared with the untreated pigment (44 grams/sec.).

The pigment treated with resin as described had better color, equal tinting strength and lower oil absorption than the untreated pigment or standard commercial TiO₂ pigment produced from the same original slurry.

When processed into an enamel the resin-treated pigment gave faster mixing, lower consistency, superior texture, brightness, gloss and hiding power as compared with the untreated pigment and commercial TiO₂ pigment from the same original slurry.

EXAMPLE 5

A 5-liter sample of TiO₂ pigment slurry was treated with titanium sulfate solution and zinc sulfate solution and was further treated with resin emulsion in the same manner as described in Example 4 with the exception that the amount of titanium sulfate solution used was equivalent to 0.66% TiO₂ calculated on the weight of the TiO₂ pigment.

The resin-treated pigment prepared in this manner filtered and washed faster with less loss than the untreated pigment of similar preparation. In the drying procedure at 240° F. the resin-treated pigment dried in 4½ hrs. to a moisture content of 0.1% as compared with 5 hrs. required by the untreated pigment, even though the filter cake in the case of the resin-treated pigment had 33% greater thickness. The resin-treated pigment micropulverized at a rate of 54 grams/sec. as compared with a rate of 49 grams/sec. for the untreated pigment. The greater speed shown by the resin-treated pigment in these manufacturing procedures is of great significance.

When processed into an enamel the resin-treated pigment gave faster mixing, lower consistency, superior texture, equal brightness, equal color, higher gloss and higher hiding power as compared with the untreated pigment.

EXAMPLE 6

The procedure of Example 5 was followed but an alkyd resin was used which was prepared as follows:

A mixture of 1 mol of phthalic anhydride, 0.153 mols of glycerine, 1.06 mols of diethylene glycol and 0.167 mol of cocoanut oil was reacted by heating at 400–450° F. until a liquid resin having an acid number of 26–32 was obtained. To 20 grams of this resin there was added 1 gram of morpholine, the mixture was heated to 130° F. and the emulsion was prepared by the procedure described in Example 2 using sufficient water to produce a final emulsion containing 2% of resin solids. The results obtained were comparable in all respects to those produced by the pigments prepared in Example 5 but using the alkyd resin described in Example 2.

EXAMPLE 7

The procedure of Example 5 was followed but an alkyd resin was used which was prepared as follows:

A mixture of 1 mol of phthalic anhydride, 0.255 mol of glycerine, 1.7 mols of diethylene glycol and 2 mols of cocoanut oil fatty acids was reacted by heating at 400–450° F. until a liquid resin having an acid number of 15–25 was obtained.

To 20 grams of this resin there was added 1 gram of morpholine, the mixture was heated to 130° F. and the emulsion was prepared by the procedure described in Example 2 using sufficient water to produce a final emulsion containing 2% of resin solids.

Other equally satisfactory emulsions of this resin were prepared using (a) 0.7 gram of commercial (27%) ammonium hydroxide, (b) 0.5 gram of ethylenediamine (commercial 68% purity) and (c) 0.6 gram of propylenediamine (commercial 80% purity).

The results obtained were comparable in all respects to those produced by the pigment prepared in Example 5 but using the alkyd resin described in Example 2.

EXAMPLE 8

The resin-treated TiO₂ pigment in this case was prepared as follows:

A 1-liter sample of TiO₂ pigment slurry was taken immediately after hydroclassification. It contained 207 grams of TiO₂. To this sample of slurry there was added 104 grams of the resin emulsion prepared with the resin and according to the procedure outlined in Example 6, the quantity of resin thus used for treatment being equivalent to 1% of the TiO₂ pigment by weight. The addition of this resin emulsion was made as a thin, slow stream with continued agitation at a temperature of 120° F. Agitation was continued for 10 minutes after the addition of the resin emulsion had been completed. To this resin-treated TiO₂ pigment slurry there was added titanium sulfate and zinc sulfate solutions equivalent to 0.66% TiO₂ and 0.33% ZnO calculated on the weight of the TiO₂ pigment, the addition being made at 120° F. with constant agitation. The treated pigment slurry was maintained under agitation and at this temperature for 1 hr., and was then adjusted from a pH of 2.1 to a pH of 7.2 by the addition of sodium carbonate and sodium hydroxide solutions. Following this adjustment of the pH, the treated $TiO_2$ pigment slurry was flocculated by the addition of magnesium sulfate solution equivalent to 0.6% $MgSO_4$ calculated on the weight of the $TiO_2$ pigment. The flocculated slurry was then filtered and washed until free from dissolved salts, followed by drying at 240° F. to a moisture content of 0.1%.

This resin-treated pigment prepared by addition of the resin emulsion prior to treatment with inorganic reagents gave results entirely comparable to those obtained for Examples 5 and 6.

EXAMPLE 9

A 10-liter sample of $TiO_2$ pigment slurry was taken immediately after hydroclassification, having a $TiO_2$ content of 233.2 grams per liter or a total content of 2332 grams. The slurry was treated with the following inorganic reagents:

Titanium sulfate solution equivalent to 0.33% $TiO_2$ on the weight of the $TiO_2$ pigment.

Zinc sulfate solution equivalent to 0.33% ZnO on the weight of the $TiO_2$ pigment.

Sodium silicate solution equivalent to 0.33% $SiO_2$ on the weight of the $TiO_2$ pigment.

Aluminum sulfate solution equivalent to 1.0% $Al_2O_3$ on the weight of the $TiO_2$ pigment.

The slurry thus treated was heated at 160° F. for one hour, and after cooling to room temperature was adjusted from a pH of 2.1 to a pH of 7.2 by the addition of sodium carbonate and sodium hydroxide solutions.

Resin emulsion in the amount of 1166 grams, using the alkyd resin type and method of emulsification described in Example 7 was added to the above treated slurry. The amount of resin emulsion added was equivalent to a concentration of 1.0% of resin on the weight of the $TiO_2$ pigment. The resin-emulsion treatment was carried out at a temperature of 130° F. with continued agitation for one hour after the addition of the resin emulsion had been completed.

The resin-treated slurry was then flocculated with magnesium sulfate equivalent to a concentration of 0.6% of $MgSO_4$ on the weight of the $TiO_2$ pigment. The flocculated slurry was subsequently filtered and washed with water until free from dissolved salts. The filtering and washing operation required an average of 2 hrs. and 50 mins. for a filter cake 17/16 in. thickness as compared with 3 hrs. and 10 mins. for a filter cake 14/16 in. thickness of a corresponding pigment prepared without the resin treatment. The filter cakes were then dried at a temperature of 240° F. to a moisture content of 0.1%. The resin-treated pigment, having a greater filter cake thickness, required only 4 hrs. drying as compared with 5 hrs. for the untreated pigment. The resin-treated pigment micropulverized at the rate of 38 gms./sec. whereas the untreated pigment micropulverized at a slower rate and since it tended to clog the micropulverizer, no definite grinding rate could be established.

When processed into an enamel the resin-treated pigment gave faster mixing, lower consistency, superior texture, equal brightness, gloss and hiding power as compared with the untreated pigment, this comparison being on the basis of 99% $TiO_2$ pigment plus 1% resin coating as versus 100% of $TiO_2$ pigment.

EXAMPLE 10

A resin-treated pigment, comparable in nature to that described in Example 9, was prepared with the same inorganic reagents and with the same type of alkyd resin at the same concentration of 1% of the weight of the $TiO_2$ pigment. However, the following variations in procedure were made in this case.

1. The sample of $TiO_2$ slurry used in this preparation was obtained by taking $TiO_2$ pigment slurry immediately after hydroclassification and further hydroclassifying so as to produce a slurry containing extreme fines. Extreme fines of this order have hitherto presented a serious texture problem because of their pronounced tendency to aggregate.

2. The slurry of $TiO_2$ pigment fines was treated with resin emulsion in an amount equivalent to 1% of resin on the weight of the $TiO_2$ pigment. It was then flocculated with magnesium sulfate equivalent to 0.6% of the weight of the $TiO_2$ pigment, in order to concentrate the slurry by decantation. The concentrated slurry was subsequently treated with the inorganic reagents in the amounts described in Example 9.

3. The slurry thus treated was heated at a temperature of 120° F. for one hour, was subsequently allowed to cool to room temperature and its pH then adjusted to 7.2 by the addition of sodium bicarbonate and sodium hydroxide solutions. This was followed by the usual filtration, washing, drying and micropulverizing.

When processed into an enamel the resin-treated pigment prepared in the above manner was distinguished by the fact that very good texture was obtained just by mixing alone. The texture was rated by a device known as the Hegman gauge which is described in Gardner's Physical and Chemical Examination of Paints, Varnishes, Lacquers and Colors, p. 277 of the 10th edition. This device is characterized by a wedge shaped channel ½ in. wide ranging from zero to 0.005 in. in depth. A linear scale begins with zero where the channel is 0.004 in. deep and ends with 8 where the channel is zero inches deep. In this device an aggregate measuring 100 microns in diameter will show at the zero reading, 50 microns in diameter at the 4 reading, and 12 microns in diameter at the 7 reading. A reading of 6 to 6½ for an enamel on this gauge is considered a good commercial grind on high-grade roller mills.

The texture for the resin-treated pigment which had been mixed only in the enamel vehicle was rated at 6 on the Hegman gauge whereas the untreated pigment of like preparation was rated a 1. When the enamel preparation had been completed the resin-treated pigment enamel had a rating of 7½ on the Hegman gauge as compared with 5½ for the untreated pigment of like preparation.

Screening through a 325$x$ mesh screen is one commercial procedure obtaining fine texture in enamels prior to packaging. When screened through 325$x$ mesh the enamel made with the resin-treated pigment showed no residue on the screen, whereas that made with the untreated pigment of like preparation showed a residue of 0.04% of the weight of pigment used. This residue when viewed under the microscope was seen to be a mixture of hard-packed pellets and aggregate lumps measuring 50 to 90 microns in diameter. The presence of this amount of extra large pigment masses in a fine enamel is sufficient to give the impression of poor texture.

As in preceding examples, the resin-treated pigment produced superior properties in respect to speed of mixing, consistency, texture as described above, brightness, color, gloss and hiding power.

Using the same resin emulsion and preparation technique as employed in Example 10, with the exception that the only inorganic reagent employed was aluminum sulfate in the amount of 1.0% $Al_2O_3$ on the weight of the $TiO_2$ pigment, samples of resin-treated pigments were prepared having resin treatments in the amounts of 0.25%, 1.0% and 5.0% on the weight of the $TiO_2$ pigment.

Improved characteristics of the same order as described in the preceding examples were obtained for these pigments.

EXAMPLE 12

Anatase $TiO_2$, produced by procedures well-known in the pigment manufacturing art, was ground and hydroclassified subsequent to calcination. A sample of this hydro-classified slurry was then processed in a manner comparable to that described in Example 7. This procedure consisted of treating the hydroclassified anatase $TiO_2$ pigment with sufficient resin emulsion of the type described in Example 7 to comprise a 1.0% concentration calculated on the weight of the $TiO_2$ pigment, the treatment being carried out at normal temperature (70° to 80° F.). Following this resin-treatment the slurry was flocculated by the addition of magnesium sulfate solution equivalent to 0.6% $MgSO_4$ calculated on the weight of the $TiO_2$ pigment. The slurry was then concentrated by decantation and was subsequently treated with sufficient aluminum sulfate to constitute a concentration of 1.0% $Al_2O_3$ calculated on the weight of the $TiO_2$ pigment. Both the flocculation with magnesium sulfate and the treatment with aluminum sulfate were carried out at normal temperature. The pH of the slurry was then adjusted to 7.2 to 7.3 by the addition of sodium carbonate and sodium hydroxide solutions, and the neutralized slurry was filtered, washed free of dissolved salts and dried at 240° F. to a moisture content of 0.1%.

When processed into an enamel the resin-treated pigment prepared in the above manner demonstrated the same improved characteristics as compared to a non-treated pigment as have been described in preceding examples.

EXAMPLE 13

Anatase $TiO_2$ was sampled after hydro-classification and the slurry was resin-treated in the same manner as described in Example 12. In similar fashion the resin-treated slurry was flocculated with magnesium sulfate, concentrated by decantation and was then treated with aluminum sulfate solution equivalent to 0.1% $Al_2O_3$ calculated on the weight of the $TiO_2$ pigment. This step was followed by filtration, washing and drying to a moisture content of 0.1%.

The resin-treated pigment thus produced likewise gave improved properties as have been described in preceding examples.

EXAMPLE 14

In another case anatase $TiO_2$ was sampled after hydroclassification and the slurry was processed in a manner similar to that described in Example 12. The first step in the process consisted of resin-treating the $TiO_2$ slurry with the same concentration and type of resin as used in Example 12 and which is completely described in Example 7. This was followed by flocculation with magnesium sulfate and concentration of the slurry by decantation. The concentrated, resin-treated slurry was then treated with titanium sulfate solution and aluminum sulfate solution in sufficient amounts to represent 0.5% $TiO_2$ and 1.0% $Al_2O_3$ respectively, calculated on the weight of the $TiO_2$ pigment. This step was then followed by filtration, washing and drying at 240° F. to a moisture content of 0.1%.

This resin-treated pigment likewise produced superior properties when processed into an enamel.

EXAMPLE 15

Other oil-modified alkyd resins which have been used with success in practicing the present invention are the following. The quantities given represent parts by weight, i. e., pounds or grams; viscosities are on the Gardner-Holdt scale, and color on the Klett scale.

Resin A

Phthalic anhydride _____ 148
Naphthenic acids (mol. wt. about 300) _____ 85
Diethylene glycol _____ 127

Mix and heat to 200–220° C. and hold at this temperature for an acid number of 30. The viscosity is Z-10 and the color is 6L to 6.

Resin B

Phthalic anhydride _____ 148
Lauric acid (commercial, 90%) _____ 85
Diethylene glycol _____ 127

React at 200–220° C. to an acid number of 30; viscosity of Z-4 to Z-5 and color of 1.

Resin C

Phthalic anhydride _____ 148
2-ethylhexoic acid _____ 85
Diethylene glycol _____ 138

React at 200–220° C. to an acid number of about 30; viscosity of Z-1 to Z-2 and color, 1-L.

Resin D

Same as Resin C, but the reaction is continued at 200–220° C. to an acid number of about 15; viscosity of Z-5 and color 3-L.

Resin E

Phthalic anhydride _____ 148
2-ethylhexoic acid _____ 207
Diethylene glycol _____ 181

React at 200–220° C. to an acid number of 30; viscosity of P and color, 1-L.

Resin F

Phthalic anhydride _____ 148
Capric acid (commercial, 90%) _____ 344
Diethylene glycol _____ 212

React at 200–220° C. to an acid number of 27; viscosity of C and color 2.

Resin G

Phthalic anhydride _____ 148
Caprylic acid, commercial _____ 288
Diethylene glycol _____ 212

React at 200–220° C. to an acid number of 29; viscosity of B-C and color, 1-2L.

Resin H

| | |
|---|---|
| Phthalic anhydride | 148 |
| Castor oil fatty acids | 298 |
| Caprylic acid, commercial | 144 |
| Diethylene glycol | 212 |

React at 200–220° C. to an acid number of 25; viscosity of K and color of 3.

Any of these oil modified alkyd resins may be substituted for those used in any of the preceding examples, in the amounts stated, with good results. Resin F is particularly good in obtaining coated titanium dioxide pigments of exceptional gloss, color, color retention and other desirable characteristics when used in amounts of 0.25% to 5% on the weight of the pigment.

Example 16

A resin-treated pigment was prepared according to a procedure similar to that described in Example 10, but differing in the following respects.

1. The resin employed was Resin E.
2. The rutile titanium dioxide slurry used in the preparation was of the regular hydro-classified type having a maximum aggregate size of 4 microns.
3. The resin emulsion was prepared in the same manner but was employed at a 10% resin concentration.
4. There was no heating of the resin emulsion-titanium dioxide pigment slurry-inorganic reagents mixture, the addition of the resin emulsion and of the inorganic reagents being effected at room temperature approximating 24° C.

The resin-treated pigment prepared in this manner showed definitely improved texture characteristics when processed into an enamel, as compared with the titanium dioxide pigment prepared according to the same procedure but not having the resin treatment.

Example 17

A titanium dioxide pigment treated with lauric acid was prepared in the same fashion as described in Example 16. In this procedure an emulsion of the lauric acid was prepared in the same fashion as the resin emulsion but using in this instance 20 gms. of lauric acid and 8.7 gms. of morpholine.

It was definitely established that the lauric acid had been applied to the pigment inasmuch as the filtrates showed a negative test for lauric acid, and the treated pigment obtained from this process was completely hydrophobic in nature whereas untreated pigment was definitely hydrophilic.

This treated pigment showed similar improved characteristics with respect to faster wetting, reduced consistency and improved texture. However, the enamel into which it was incorporated exhibited a definite deficiency in gloss.

This example establishes the fact that organic acids can be applied by this process but depending on their selection may produce some deficiencies in the treated pigment prepared thereby.

Example 18

A resin-treated titanium dioxide was prepared in the same manner as described in Example 16, but differs in that the resin treating agent consisted of equal parts by weight of the resin described in Example 7 and Resin E of Example 15.

The resin-treated pigment produced in this fashion displayed the same improved characteristics as have been described in the preceding examples.

Example 19

Following the procedure outlined in Example 16, a resin-treated pigment was prepared using the resin described in Example 7. This preparation is characterized by the addition of the resin being as a 10% concentration emulsion and by the addition of the resin-emulsion and inorganic reagents at room temperature, i. e., without resort to heating.

The pigment prepared in this manner showed the improved characteristics previously described and was particularly significant in the improved texture obtained.

Example 20

In this example the procedure of Example 19 was followed with the exception that the pigment slurry treated with the resin emulsion and inorganic treating agents was heated for 1 hr. at 50° C.

This pigment likewise demonstrated improved properties when processed into an enamel.

Example 21

The procedure for the preparation of this resin-treated rutile titanium dioxide was similar in character to that described in Example 20 but differs in the following respects.

1. The titanium dioxide pigment slurry was flocculated with magnesium sulfate, concentrated by decantation, and was then treated with the inorganic reagents previously described. The slurry thus treated was heated for 1 hr. at 60° C. and was subsequently neutralized with sodium carbonate and sodium hydroxide solutions as detailed in preceding examples.
2. When the treated slurry had cooled to 50° C. it was further treated with the resin emulsion as used in Example 16. Following agitation to insure thorough incorporation of the resin emulsion filtration, washing and drying and pulverization of the dried product were conducted in the usual manner.

The resin-treated pigment obtained by this procedure was also characterized by the various improved properties as have been previously cited.

What we claim is:

1. Calcined titanium dioxide pigments in the form of substantially dry powders having an average particle size of about 0.2–0.3 micron diameter, the individual particles of said pigments carrying a coating of a non-drying water-insoluble liquid alkyd resin which is the reaction product of an organic polycarboxylic acid, a polyhydric alcohol, and a monocarboxylic acid selected from the group consisting of non-drying aliphatic and cycloaliphatic monocarboxylic acids containing from about 6 to about 26 carbon atoms in an amount within the range of 0.25% to 5% based on the weight of the pigment.

2. Pigments according to claim 1 in which the alkyd resin is the reaction product of an organic polycarboxylic acid, a dihydric alcohol, and a non-drying monocarboxylic acid as defined in said claim.

3. Pigments according to claim 2 in which the non-drying monocarboxylic acid is a fatty acid of 6–12 carbon atoms.

4. A water-insoluble pigment in the form of a substantially dry powder, the individual particles of said powder carrying a coating of a non-drying, water-insoluble, liquid alkyd resin which is the reaction product of an organic polycarboxylic acid, a polyhydric alcohol, and a monocarboxylic acid selected from the group consisting of non-drying aliphatic and cycloaliphatic monocarboxylic acids containing from about 6 to about 26 carbon atoms in an amount within the range of 0.25% to about 35% based on the weight of the pigment.

5. Pigments according to claim 4 in which the alkyd resin is the reaction product of an organic polycarboxylic acid, a dihydric alcohol, and a non-drying monocarboxylic acid as defined in said claim.

6. Pigments according to claim 5 in which the non-drying monocarboxylic acid is a fatty acid of 6–12 carbon atoms.

7. In a process of finishing a calcined titanium dioxide pigment which includes the steps of wet grinding and hydroclassifying the calcined titanium dioxide in water to an average particle size of 0.2–0.3 microns, deflocculating and filtering the resulting dispersion and drying the dewatered product at temperatures of 100–200° C. to a water content of about 0.2%, the method of improving the filtering and drying properties of the pigment slurry and avoiding cementation of the pigment particles into aggregates during the drying step which comprises preparing a water emulsion of a liquid, non-volatile, non-drying, water-insoluble organic coating material in an amount equal to about 0.25% to 5% of the weight of the titanium dioxide and mixing it with the hydroclassified titanium dioxide dispersion by simple agitation at a point prior to the filtering step, whereby particles of the titanium dioxide are caused to adhere to the surfaces of the globules of emulsified coating material and the filtering and washing of the titanium dioxide is facilitated, and whereby the coating material is caused to spread over the surfaces of the titanium dioxide particles during the drying step to prevent a surface-to-surface contact thereof.

8. A method according to claim 7 in which the emulsion is prepared by reacting a volatile organic base with a liquid, non-volatile, non-drying, water-insoluble organic coating material having an acid number of about 10–30 and then agitating it with water, whereby breaking of the emulsion during the drying of the pigment is facilitated.

9. A method according to claim 7 in which the organic base is morpholine.

10. In a process of finishing a calcined titanium dioxide pigment which includes the steps of wet grinding and hydroclassifying the calcined titanium dioxide in water to an average particle size of 0.2–0.3 microns, deflocculating and filtering the resulting dispersion and drying the dewatered product at temperatures of 100–200° C. to a water content of about 0.2%, the method of improving the filtering and drying properties of the pigment slurry and avoiding cementation of the pigment particles into aggregates during the drying step which comprises reacting a liquid, non-drying, water-insoluble alkyd resin having an acid number of at least 10 with a volatile organic base and agitating the resulting product with water to form an aqueous resin emulsion, the amount of said resin being equal to about 0.25% to 5% of the weight of the titanium dioxide, and mixing the emulsion so prepared with the hydroclassified titanium dioxide dispersion by simple agitation at a point prior to the filtering step, whereby particles of the titanium dioxide are caused to adhere to the surfaces of the globules of emulsified coating material and the filtering and washing of the titanium dioxide is facilitated, and whereby the coating material is caused to spread over the surfaces of the titanium dioxide particles during the drying step to prevent a surface-to-surface contact thereof.

11. A method according to claim 10 in which the alkyd resin is a fatty acid-modified polyhydric alcohol-polybasic acid resin wherein the fatty acid is a non-drying acid of 6–26 carbon atoms.

12. A method according to claim 11 wherein the polyhydric alcohol component of the resin is a glycol.

13. A method according to claim 10 in which the volatile organic base is morpholine.

WALLER H. HOBACK.
WINFRED J. CAUWENBERG.
WALTER R. WHATELY.

REFERENCES CITED

The following references are of record in the file of this patent:

UNITED STATES PATENTS

| Number | Name | Date |
|---|---|---|
| 1,863,331 | Hailwood et al. | June 14, 1932 |
| 2,000,003 | Verbyla | Apr. 30, 1935 |
| 2,068,066 | O'Brien | Jan. 19, 1937 |